April 8, 1947. H. G. KERBAWY Re. 22,862
SOCK DRIER
Original Filed Jan. 20, 1945
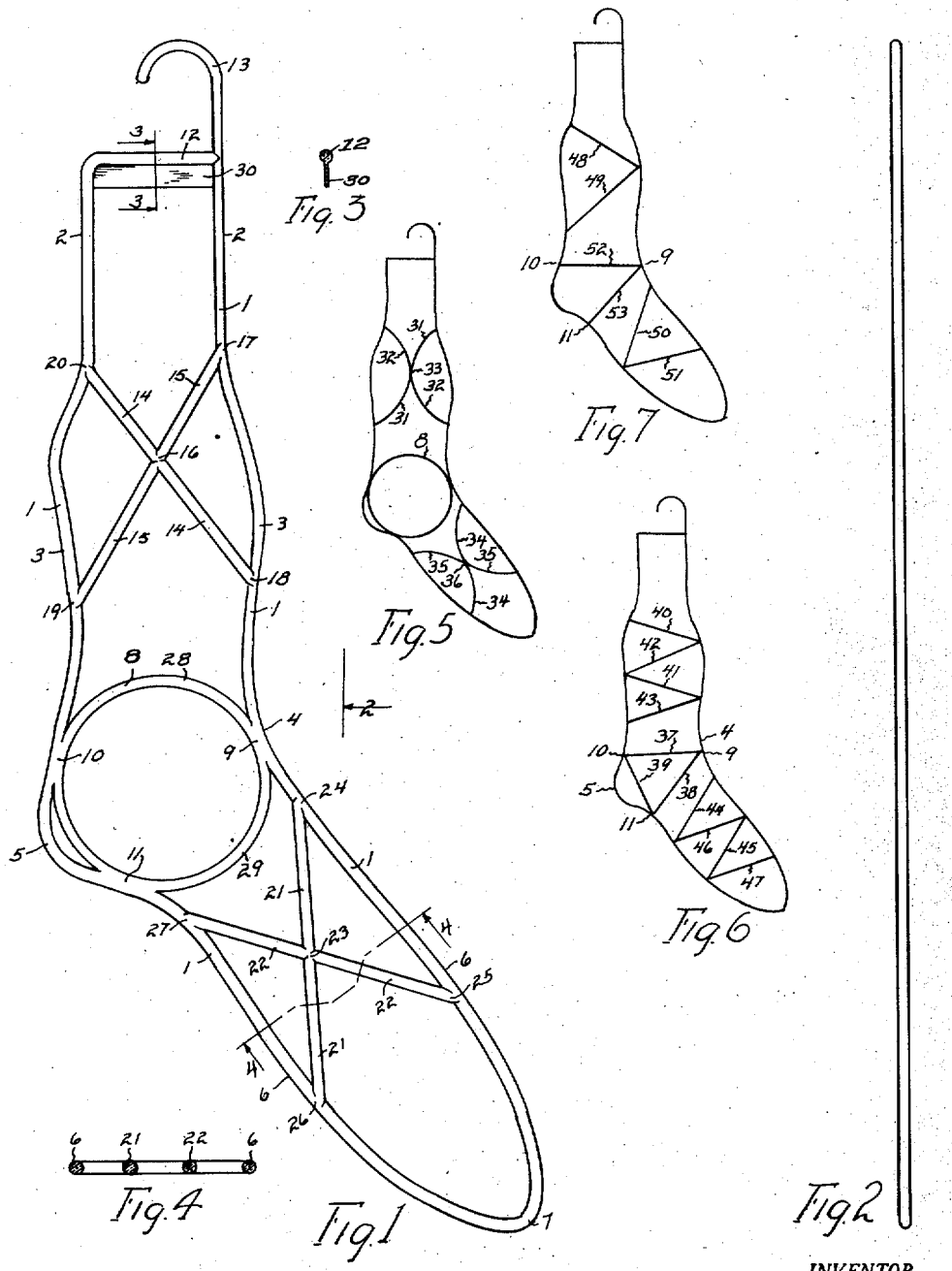
INVENTOR.
Haford G. Kerbawy
BY Harry R. Canfield
ATTORNEY Reissued Apr. 8, 1947

Re. 22,862

UNITED STATES PATENT OFFICE 22,862

SOCK DRIER

Haford G. Kerbawy, Blissfield, Mich., assignor to Alexander G. Kerby, Cleveland, Ohio Original No. 2,400,203, dated May 14, 1946, Serial No. 573,784, January 20, 1945. Application for reissue January 9, 1947, Serial No. 721,000

8 Claims. (Cl. 223—75)

This invention relates to devices commonly known in the trade as sock-driers, that is devices to support laundered socks, stockings, or the like while drying, to cause them to dry with normal shape and obviate the necessity of ironing them, and to prevent shrinkage.

Sock driers for this general purpose have been proposed heretofore and a popular construction comprises a form made of wood, to be inserted into the wet laundered sock, and hung up to dry. There are obvious objections to wood as a material for this purpose, among which are its moisture-absorbent property, and the difficulty of keeping it clean and sanitary; and its liability to crack and split due to repeated wetting and drying in use. It has also been proposed to make sock driers from metal, but metal is an unsatisfactory material for the purpose because of its weight and its liability to oxidize in the presence of moisture and stain the sock; and because of the cost of fabricating the metal into the desired form and of rendering it perfectly smooth so as not to snag the threads of the sock.

The introduction of plastic materials in the various arts has led to its consideration as a suitable material for sock driers but so far as I am aware it has heretofore been impossible to make a sock drier from a plastic because of certain requirements of the finished article and because of certain difficulties in its manufacture.

A sock drier for operative purposes must have a perfectly smooth, rounded, edge contour of the general form of a flattened sock; and must be of considerable overall length from toe to top, approximately 26 inches for full length socks; and at the same time must be in general flat or planar and only about $\frac{3}{16}$ inch to $\frac{1}{4}$ inch thick; and it must be possible to manufacture it cheaply; so that if it is to be made from a plastic, the only practicable process is that by which the plastic is injected into a mold; but to inject plastic into all parts of such a thin and long mold introduces practical difficulties.

Also, a plastic sock drier made by the injection-mold process must contain the minimum of plastic material for the sake of cheapness, and this and other requirements point to the necessity of an open-work or perforated type of drier; but it has been found that a plastic sock drier of this type (comprising as it must an open framework having a smooth edge portion of sock contour all around its periphery), when made by the injection-mold process, will permanently twist and warp out of a plane when taken from the mold, due to strains set up in it which cannot be prevented.

It follows that before a molded plastic sock drier can be made which will be acceptable to the trade, something must be done to overcome and prevent this twisting, and warping; and so far as I am aware this has not been heretofore accomplished.

Accordingly it is among the objects of the present invention:

To provide generally an improved device of the sock drier class;

To provide an open-work or perforated sock drier made from plastic material by the injection-mold process which has a smooth peripheral edge of the size and contour of a flat sock, and which peripheral edge lies flat or in a single plane;

To provide an open work or perforated planar sock drier made from plastic by the injection-mold process, and constructed to counteract and prevent its tendency to warp or twist out of a plane due to internal strains set up in the material by the process.

Other objects will be apparent to those skilled in the art to which my invention appertains.

The invention is fully disclosed in the following description taken in connection with the accompanying drawing, in which:

Fig. 1 is a side elevational view of a sock drier for full length socks embodying my invention;

Fig. 2 is an edge or side elevational view, taken in the direction of the arrow 2 of Fig. 1;

Figs. 3 and 4 are sectional views taken respectively from the planes 3—3 and 4—4 of Fig. 1;

Figs. 5, 6, and 7 are diagrammatic views illustrating other forms or modifications of certain structural features of the embodiment of Fig. 1.

In Figs. 1 and 2, I have shown the preferred embodiment of the invention. It will be seen to comprise a peripheral or contour element 1 to be inserted into and fit a flattened sock to be dried, and which correspondingly has opposite top portions 2—2 for the "top" of the sock, opposite leg portions 3—3 for the leg proper, an ankle portion 4 opposite a heel portion 5, opposite foot portions 6—6, and a toe portion 7.

At generally the middle of the device is a circular tie element 8 integrally joined to the ankle portion 4 at a point 9, and integrally joined to the heel portion at spaced points 10 and 11. Joining the two opposite top portions 2—2 at their upper terminations is an end element 12. One of the top portions 2 continues above the device as at 13 in the form of a hook by which the device may be supported.

A pair of crossed tie elements 14 and 15, integrally joined together at 16 where they intersect, are provided in the upper part of the device, and integrally joined at spaced points 17 and 18 to what may be called the front of the contour element 1, and integrally joined at spaced points 19 and 20 to the rear of the contour element 1; and in general the foot portion of the device is a pair of crossed tie elements 21 and 22, integrally joined at 23 where they cross each other, and integrally joined at spaced points 24 and 25 to the front, and at spaced points 26 and 27 to the rear, of the contour element 1.

The contour element 1, the circular tie element 8, the crossed tie elements 14 and 15, the crossed tie elements 21 and 22, the end element 12, and the hook element 13, are all preferably of circular cross section as is indicated in Fig. 4 for some of the parts. All of the parts above mentioned are disposed substantially in a plane as is indicated by Fig. 2.

As mentioned above, the entire device is made by injecting plastic material under pressure into a metal mold by well known processes; and it has been found that for a device such as that illustrated in Fig. 1 and Fig. 2 and measuring say 26 inches between the upper and lower extreme ends, and with the cross section of the elements thereof approximately one quarter inch in diameter, the entire device may be made in one piece by injecting plastic into the mold at two points on the circular element 8, for example at the points 28 and 29.

The end element 12 may have inwardly thereof and integral with the top elements 2—2, a thin fin or web 30, upon which a label, patent number, or other indicia may conveniently be applied.

As mentioned hereinbefore, and as will be referred to later, injection-molded plastic material has qualities and properties which render it advantageous and superior to other materials for a device of this class; but as is well known, such material and the practice of the injection-mold process is expensive, and in order to make such a device practicable and keep its cost of production down to a point where its selling price will be acceptable to the trade, the amount of the plastic material must be kept down to the minimum. This would suggest that all that would be necessary in such a device would be a contour element 1 having the top, leg, heel, ankle, foot and toe portions referred to above, and of outwardly rounded form; but such a contour element alone when taken from the mold would not retain the contour shape of its mold, due to internal strains within the material, as applicant has found.

It would appear to be a simple matter, furthermore, to compel the contour element to retain its sock-like, molded, contour form, because this could obviously be accomplished by tying opposite parts of the contour element together by transverse structural elements; but, as I have found, if merely this were done, without regard to the arrangement of such tie elements, or with any obvious arrangement, then the strains which would still be in the contour element would cause the contour element as a whole to twist, or bend, or twist and bend, out of its plane when taken from the mold.

After numerous experiments, I have found that this twisting and bending or warping can be prevented if the forward and rearward parts of the contour element be tied together by transverse tie elements involving a certain structural principle which is embodied in Fig. 1 and which will now be explained.

The said tie elements which I employ for this purpose in the particular embodiment of Fig. 1, are the elements 14 and 15, the element 8, and the elements 21 and 22.

It will be observed that the elements 14 and 15 provide a tying action in two diagonal directions, the diagonal element 14 effecting a tying action between the points 18 and 20 on the forward and rearward parts of the contour element 1 in one diagonal direction, and the diagonal tie element 15 providing a tying action between the points 17 and 19, in another diagonal direction; and the points 19 and 20 being spaced apart as are the other points 17 and 18.

Similarly, the diagonal tie element 21 connecting the points 24 and 26 is at a different diagonal direction from the tie element 22 connecting the points 25 and 27, and the points 24 and 25 being spaced apart as are the points 26 and 27.

The circular tie element 8 ties the forward and rearward parts of the contour element 1 together, at three points, the point 9 on the forward part and the two points 10 and 11 on the rearward part; the three points 9, 10, and 11 defining a triangle.

The structural principle therefore which prevents the twisting and bending and warping of the contour element, comprises ties which provide a tying action in two different diagonal directions in the upper part of the device, two ties providing a tying action in two diagonal directions in the lower part of the device, and a triangular tie at the center of the device.

The said arrangement of the tie elements therefore does two things: it prevents the contour element from warping out of the preselected sock-like contour shape given to it by the mold; and they prevent the contour element as a whole from warping or twisting or bending out of a plane.

The arrangement of these tie elements shown in Fig. 1 is the preferred form because of the symmetrical and balanced design which it gives to the device, but the same structural principle may be embodied in other arrangements of tie elements, some of which are shown in Figs. 5, 6, and 7, where the tie elements and the contour element are represented diagrammatically by single lines.

In the diagrammatic form of Fig. 5 for example, the tie members 31—32 in the upper part of the device are curvilinear, intersecting and integrally joined at 33, and correspond to the tie members 14 and 15 of the form of Fig. 1; and the tying effects thereof and the action of preventing said twisting and warping is effected generally in two diagonal directions, although the diagonal lines of action are not themselves rectilinear.

Similarly, in the foot portion, the tie elements 34 and 35, diagonal in two directions, are curvilinear, intersecting and integral at 36. In this form, Fig. 5, the circular tie member 8 of Fig. 1 is retained.

In the form of Fig. 6, the tie member between the ankle and heel portions 4—5, comprises three rectilinear elements 37, 38, and 39, connecting the points 9, 10, and 11 referred to in connection with Fig. 1; and a triangle is thus substituted for the circle 8 of Fig. 1, and provides the same anti-twisting and warping principle as the circle of Fig. 1; but the appearance is different. Also in this Fig. 6, rectilinear tying elements 40 to 43 inclusive are provided in the upper part, the elements 40 and 41 being in one diagonal direction, and the elements 42 and 43 in another diagonal direction; and, in the foot portion, diagonal elements 44 and 45 in one direction and 46 and 47 in another direction are provided. These elements perform the tying function and principle of the intersecting diagonal elements of Fig. 1.

In the form of Fig. 7, two diagonal elements 48 and 49 in the leg portion at different diagonal directions, and two diagonal elements 50 and 51 in the foot portion in two diagonal directions are provided, but not intersecting as are the corresponding pairs of diagonal elements in the form of Fig. 1; and at the ankle and heel portions, only two tie elements 52 and 53 are provided connecting the heel points 10 and 11 with the ankle point 9. The tie element arrangement of this figure probably utilizes the very minimum of plastic material by which the anti-warping and twisting results can be obtained for a full length sock drier.

From the foregoing it will now be apparent that the tying means for providing the tying action in two diagonal directions may have various forms and the material of the tying means may be variously disposed. Two general forms have been illustrated and described as exemplified by Figs. 6 and 7 wherein the tying means comprises separate linear tying elements, and as exemplified in Figs. 1 and 5, wherein the tying means is of a more unitary character. Other forms will occur to those skilled in the art.

When the invention is to be practiced with shorter or ankle-length socks, the leg portions 3—3 of the drawing, may be made shorter, for further economy of material, expense of molds, etc., and the leg portion of the device will then be so short that there will be little or no tendency for it to bend or warp out of a plane; and accordingly the tie elements 14—15 of Fig. 1 between the leg portions 3—3 (and the corresponding tie elements in the modifications of Figs. 5 to 6) may be omitted.

It is believed that this will be apparent without further illustration or description.

From the foregoing it is believed to be apparent that the invention is predicated upon the desirability of utilizing plastic material, moldable in a die or mold, for a device of this class, because it can be molded and come out of the mold with all surfaces thereof smooth, and because it will be moisture-proof, non-corrosive, light in weight, of pleasing appearance, and cheap to manufacture in quantities; but that because of the shape that the peripheral contour of such a device must have, and because of the fact that expense prohibits making it with plastic material filling solidly the space within the peripheral contour, the only practicable and salable plastic device is one in which a linear peripheral contour element is provided braced by transverse tie elements, but it is a concurrent fact that if transverse tie elements are merely provided of some obvious arrangement, then the said advantages of plastic material for the device cannot be enjoyed because of the peculiar fact that in molding the device internal strains are set up in the material, so that when it is taken from the mold it warps and twists out of a plane. It is essential therefore that this twisting and warping must be prevented, but to prevent it by tying together opposite portions of the contour element by tie elements, such tie elements must be provided and disposed so as to exert the maximum anti-warping and twisting reactions with the minimum of material. By analysis and numerous experiments, I believe that I have found the solution to this problem in tie elements having the structural principles set forth above and as expressed in the appended claims.

The extreme outer surface of the peripheral element 1, is preferably rounded to avoid having the sock dry with longitudinal creases, and this is preferably accomplished by making it of circular cross-section; but a rounded exterior can be had with other cross-sectional forms as will be apparent.

The invention has been illustrated and described above in a preferred embodiment, and in several modifications thereof; but the invention is comprehensive of all changes in and modifications of these illustrated and described forms, which come within the scope of the appended claims.

I claim:

1. A sock drier device comprising an outer peripheral element having the shape and size of the interior of a flattened sock; the peripheral element having oppositely spaced leg portions, oppositely spaced foot portions, and oppositely spaced heel and ankle portions; tie elements tying the leg portions together and extending in two diagonal directions therebetween; the elements tying the foot portions together and extending in two diagonal directions therebetween; and tie elements tying the heel and ankle portions together; the tie elements and the peripheral element being integrally united, and formed in a single piece from molded plastic material, and all lying in substantially a plane.

2. A sock drier device comprising an outer peripheral element having the shape and size of the interior of a flattened sock; the peripheral element having oppositely spaced leg portions, oppositely spaced foot portions, and oppositely spaced heel and ankle portions; tie elements tying the leg portions together and extending in two diagonal directions therebetween; tie elements tying the foot portions together and extending in two diagonal directions therebetween; and tie elements tying two spaced points of the heel portion to the ankle portion; the tie elements and the peripheral element being integrally united, and formed in a single piece from molded plastic material, and all lying in substantially a plane.

3. A sock drier device comprising an outer peripheral element having the shape and size of the interior of a flattened sock; the peripheral element having oppositely spaced leg portions, oppositely spaced foot portions, and oppositely spaced heel and ankle portions; tie elements tying the leg portions together and extending in two diagonal directions therebetween; tie elements tying the foot portions together and extending in two diagonal directions therebetween; and tie elements tying two spaced points of the heel portion to a single point of the ankle portion; the tie elements and the peripheral element being integrally united, and formed in a single piece from molded plastic material, and all lying in substantially a plane.

4. A sock drier device comprising an outer peripheral element having the shape and size of the interior of a flattened sock; the peripheral element having oppositely spaced leg portions, oppositely spaced foot portions, and oppositely spaced heel and ankle portions; tie elements tying the leg portions together and extending in two diagonal directions therebetween; tie elements tying the foot portions together and extending in two diagonal directions therebetween; and tie elements tying two spaced points of the heel portion together and tying each of the points of the heel portion to the ankle portion; the tie elements and the peripheral element being integrally united, and formed in a single piece from molded plastic material, and all lying in substantially a plane.

5. A sock drier device comprising an outer peripheral element having the shape and size of the interior of a flattened sock; the peripheral element having oppositely spaced front and rear leg portions, oppositely spaced front and rear foot portions, and oppositely spaced heel and ankle portions; tie elements tying the leg portions together and extending in two generally diagonal directions therebetween; tie elements tying the foot portions together and extending in two generally diagonal directions therebetween; and a tie element tying the heel and ankle portions together; the tie elements and the peripheral element being formed from molded plastic material, and constituting a single integral piece.

6. A sock drier device comprising an outer peripheral element having the shape of the interior of a flattened sock; the peripheral element having spaced-apart, elongated, front and rear portions; tie means tying the front and rear portions together and formed to provide tying action in two diagonal directions; the tie means and the peripheral element being formed from molded plastic material and constituting an integral piece and lying substantially in a plane.

7. A sock drier device comprising an outer peripheral element having the shape of the interior of a flattened sock; the peripheral element having spaced-apart, elongated, front and rear portions; a plurality of tie means spaced apart longitudinally along the device; the several means tying the front and rear portions together and formed and disposed to provide tying action in two diagonal directions; the tie means and the peripheral element being formed from molded plastic material and constituting an integral piece, and lying substantially in a plane.

8. A sock drier device comprising an outer peripheral element having the shape of the interior of a flattened sock; the peripheral element having spaced-apart, elongated, front and rear portions; tie means tying the front and rear portions together; the tie means and the peripheral element being formed from molded plastic material and constituting an integral piece and lying substantially in a plane; and the material of the tying means being disposed to provide tying action between points on the front and rear portions in one diagonal direction; and to provide tying action between points on the front and rear portions in another diagonal direction.

HAFORD G. KERBAWY.